(12) United States Patent
Okawa et al.

(10) Patent No.: US 9,668,218 B2
(45) Date of Patent: May 30, 2017

(54) VEHICLE-MOUNTED COMMUNICATION DEVICE, AND METHOD OF CONTROLLING SAME

(71) Applicant: CLARION CO., LTD., Saitama (JP)

(72) Inventors: Akihiro Okawa, Saitama (JP); Miho Kanamori, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/038,806

(22) PCT Filed: Jul. 25, 2014

(86) PCT No.: PCT/JP2014/069741
§ 371 (c)(1),
(2) Date: May 24, 2016

(87) PCT Pub. No.: WO2015/075969
PCT Pub. Date: May 28, 2015

(65) Prior Publication Data
US 2016/0360486 A1    Dec. 8, 2016

(30) Foreign Application Priority Data

Nov. 25, 2013  (JP) ................. 2013-242663

(51) Int. Cl.
*H05K 11/02* (2006.01)
*H04M 1/00* (2006.01)
(Continued)

(52) U.S. Cl.
CPC ...... *H04W 52/0241* (2013.01); *H04B 1/3822* (2013.01); *H04B 17/318* (2015.01);
(Continued)

(58) Field of Classification Search
CPC .................. H04M 1/6091; H04M 1/6075
(Continued)

(56) References Cited

U.S. PATENT DOCUMENTS 6,664,899 B1 * 12/2003 Tsuchihashi .......... B60R 25/245
                                                          180/287
2004/0127206 A1 * 7/2004 Van Bosch ....... H04W 52/0261
                                                          455/418

(Continued)

FOREIGN PATENT DOCUMENTS

JP    2001-180444 A    7/2001
JP    2008-14851 A     1/2008

OTHER PUBLICATIONS

International Search Report issued for corresponding PCT/JP2014/069741 application.

(Continued)

*Primary Examiner* — Simon Nguyen
(74) *Attorney, Agent, or Firm* — IP Business Solutions, LLC

(57) ABSTRACT

A vehicle-mounted communication device, which consumes less electric power, and a method of controlling the vehicle-mounted communication device are provided. The vehicle-mounted communication device includes a modem 12, which is configured to perform wireless communication via a portable telephone network, a judgment part 183, which is configured to judge whether the modem 12 is in a wireless communicable state, and a judging timing determination part 184. The judging timing determination part 184 is configured to stop the judging operation of the judgment part 183 until a predetermined condition is satisfied, when the judgment part 183 judges that the wireless communication is not in an enabled state while a driving source of a vehicle is stopped.

15 Claims, 9 Drawing Sheets

(51) Int. Cl.
    *H04W 52/02* (2009.01)
    *H04W 4/04* (2009.01)
    *H04B 17/318* (2015.01)
    *H04B 1/3822* (2015.01)
(52) U.S. Cl.
    CPC ....... *H04W 4/046* (2013.01); *H04W 52/0277* (2013.01); *Y02B 60/50* (2013.01)
(58) Field of Classification Search
    USPC ......... 455/67.11, 569.1–569.2, 226.2, 550.1, 455/345
    See application file for complete search history.

(56) References Cited

U.S. PATENT DOCUMENTS

| | | | | |
|---|---|---|---|---|
| 2005/0143146 A1* | 6/2005 | Kim | ................ | H04W 52/0216 455/574 |
| 2005/0179526 A1* | 8/2005 | Flick | ...................... | B60R 25/04 340/426.19 |
| 2006/0073857 A1* | 4/2006 | Hanabusa | ............ | G07B 15/063 455/572 |
| 2006/0133104 A1* | 6/2006 | Okubo | .................... | B60Q 1/12 362/545 |
| 2008/0234895 A1* | 9/2008 | Veerasamy | ....... | B32B 17/10036 701/36 |
| 2008/0278345 A1* | 11/2008 | Van Bosch | ........ | H04B 7/18517 340/870.07 |
| 2011/0193721 A1* | 8/2011 | Koie | ...................... | B60R 25/00 340/901 |
| 2015/0210181 A1* | 7/2015 | Niioka | .................. | H01M 10/48 701/22 |
| 2015/0304954 A1* | 10/2015 | Korenaga | ................. | B60L 1/00 370/311 |
| 2016/0005250 A1* | 1/2016 | Inoue | .................... | B60R 25/209 701/2 |

OTHER PUBLICATIONS

Written Opinion of the International Search Authority issued for corresponding PCT/JP2014/069741 application.
International Preliminary Report on Patentability issued for corresponding PCT/JP2014/069741 application.

* cited by examiner

FIG.2

| FUNCTIONAL UNIT | ORDINARY MODE | LOW POWER CONSUMPTION MODE | SUPER LOW POWER CONSUMPTION MODE |
|---|---|---|---|
| CONTROLLING UNIT | ON | POWER SAVING MODE | POWER SAVING MODE |
| MODEM | ON | POWER SAVING MODE | OFF |
| GPS RECEIVER | ON | POWER SAVING MODE | POWER SAVING MODE |
| CAN TRANSCEIVER | ON | POWER SAVING MODE | POWER SAVING MODE |
| RTC | ON | POWER SAVING MODE | POWER SAVING MODE |
| IMPACT DETECTING SENSOR | ON | POWER SAVING MODE | POWER SAVING MODE |

FIG.3

| VEHICLE POWER SOURCE | OPERATION MODE OF TELEMATICS CONTROL UNIT | ELECTRIC CURRENT CONSUMPTION (AVERAGE) |
|---|---|---|
| IG SWITCH IS IN THE ON STATE | ORDINARY OPERATION MODE | 1.0 A |
| IG SWITCH IS IN THE OFF STATE | LOW POWER CONSUMPTION MODE (POWER SOURCE OF MODEM IS IN THE ON STATE) | 1.0 mA |
| | SUPER LOW POWER CONSUMPTION MODE (POWER SOURCE OF MODEM IS IN THE OFF STATE) | 0.1 mA |

FIG.4

| VEHICLE POWER SOURCE | OPERATION MODE OF TELEMATICS CONTROL UNIT | | ELECTRIC CURRENT CONSUMPTION (AVERAGE) |
|---|---|---|---|
| IG SWITCH IS IN THE OFF STATE | LOW POWER CONSUMPTION MODE (POWER SOURCE OF MODEM IS IN THE ON STATE) | WITHIN THE COMMUNICABLE AREA | 1.0 mA |
| | | OUT OF THE COMMUNICABLE AREA | 5.0 mA |

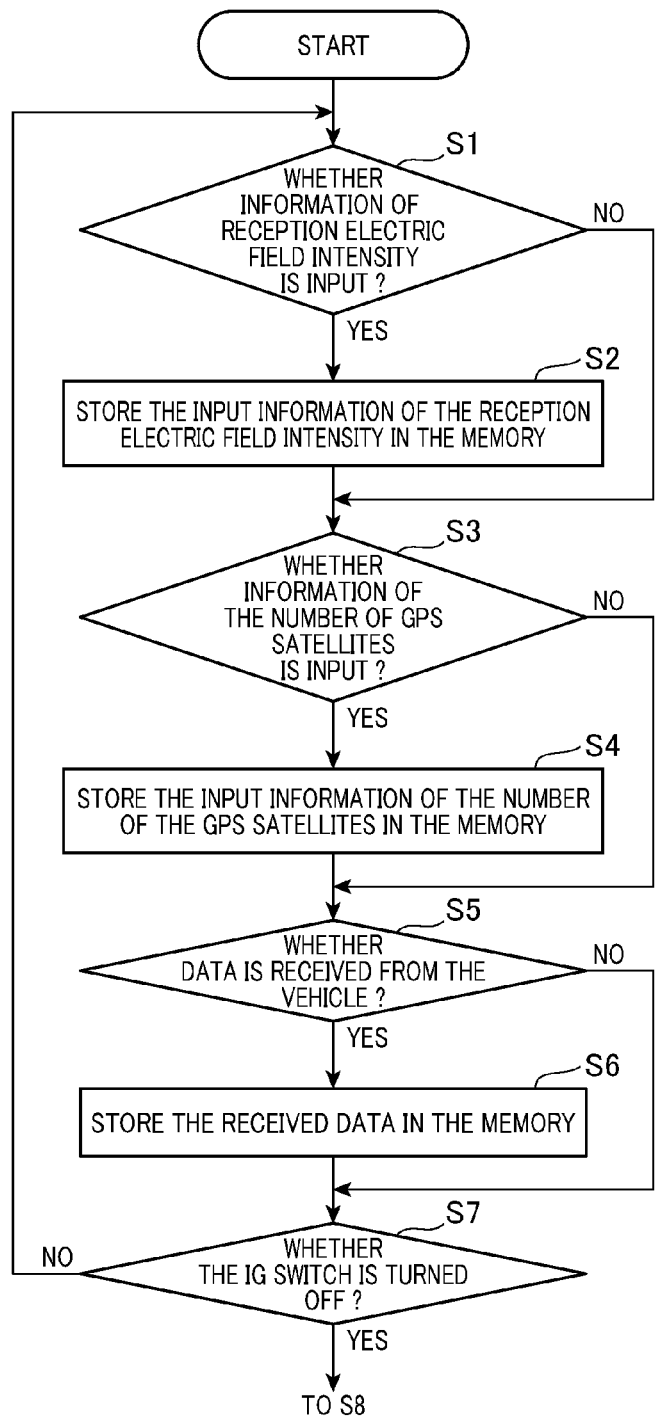

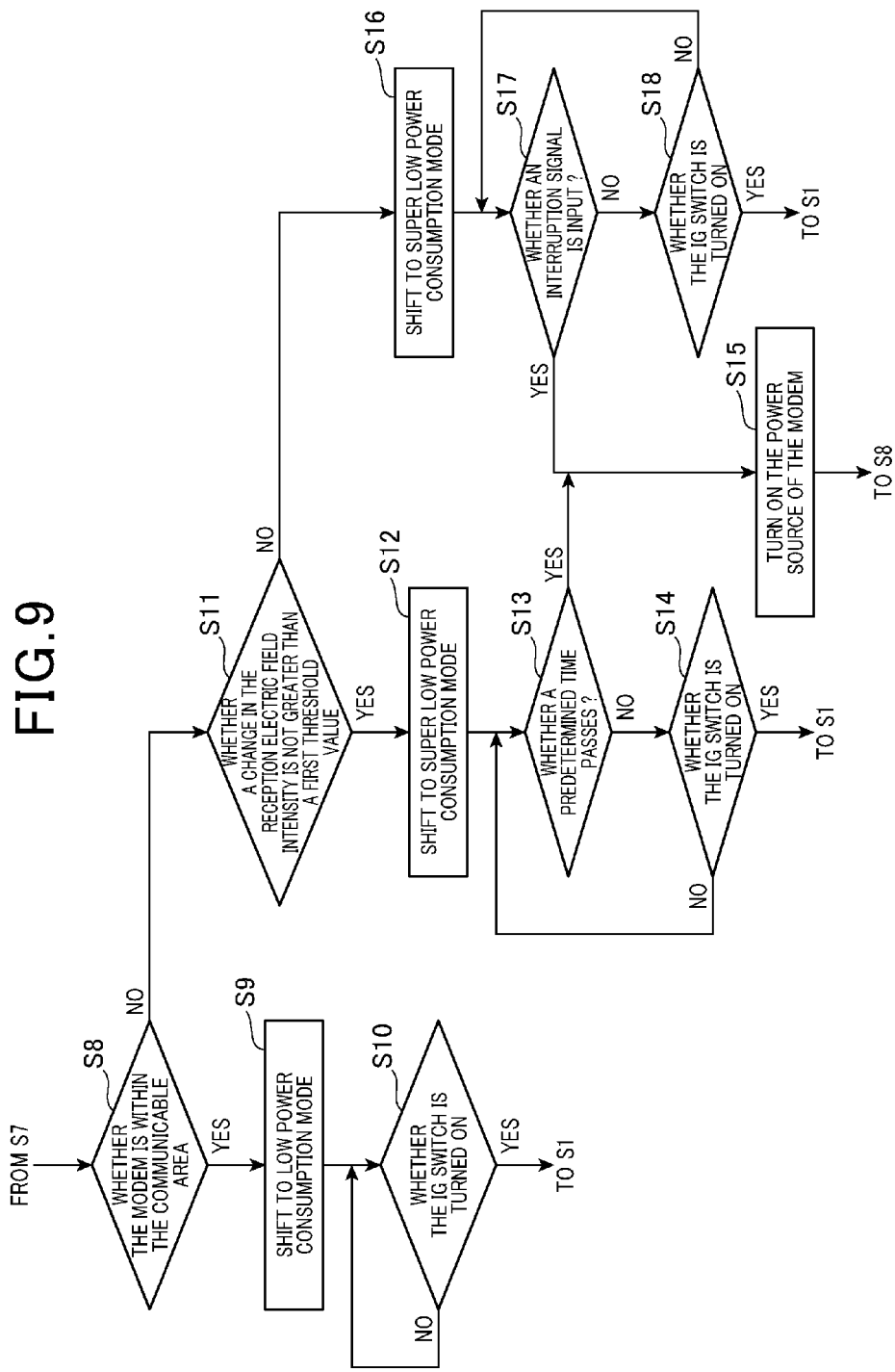

VEHICLE-MOUNTED COMMUNICATION DEVICE, AND METHOD OF CONTROLLING SAME

TECHNICAL FIELD

The present invention relates to a vehicle-mounted communication device and a method of controlling the same.

BACKGROUND ART

The background art in the field of the present technique may be found in Japanese Unexamined Patent Application Laid-Open No. 2001-180444 (Patent Literature 1). The Patent Literature 1 discloses "a theft reporting device, which is provided with a function of transmitting a theft signal using an automobile telephone and is inhibited from transmitting the theft signal when the automobile telephone is out of its talking area". In addition, according to the Patent Literature 1, "an interval of the transmission of the theft signal while an engine is stopped is made longer than the interval while the engine is running, even when the automobile telephone is within the talking area".

CITATION LIST

Patent Literature

Patent Literature 1: Japanese Unexamined Patent Application Laid-Open No. 2001-180444

SUMMARY OF INVENTION

Technical Problem

According to the Patent Literature 1, power consumption can be reduced while the engine of a vehicle is stopped, but there is no consideration of the point that a great amount of electric power is consumed to judge whether the vehicle reenters a portable telephone network while the vehicle is out of the portable telephone network.

The present invention has been achieved in view of the above problem, and an object of the present invention is to provide a vehicle-mounted communication device, which consumes less electric power, and a method of controlling the vehicle-mounted communication device.

Solution to Problem

In order to solve the above problem, the present invention provides a vehicle-mounted communication device including, for example, a communication part, which is configured to perform wireless communication, a judgment part, which is configured to judge whether the communication part is in a wireless communicable state, and a judging timing determination part. The judging timing determination part is configured to stop the judgment part from operating of judging whether the communication part is in the wireless communicable state by operating the communication part, until a predetermined condition is satisfied, when the judgment part judges the communication part as being not in the wireless communicable state while a driving source of the vehicle is stopped.

Advantageous Effects of Invention

According to the present invention, the power consumption can be further reduced.

BRIEF DESCRIPTION OF DRAWINGS

FIG. 2 is a view showing power modes of a telematics control unit and showing electric power to be supplied to each unit of the telematics control unit in each of the power modes.

FIG. 3 is a view showing an average value of electric current consumption in each operation mode.

FIG. 4 is a view showing an average value of electric current consumption in a case of shifting the mode of a telematics control unit to a low power consumption mode when the telematics control unit is out of a communicable area of a portable telephone network.

FIG. 8 is a flow chart showing a processing procedure of a controlling unit.

FIG. 9 is a flow chart showing a processing procedure subsequent to the processing procedure shown in FIG. 8.

DESCRIPTION OF EMBODIMENTS

Figure 1:
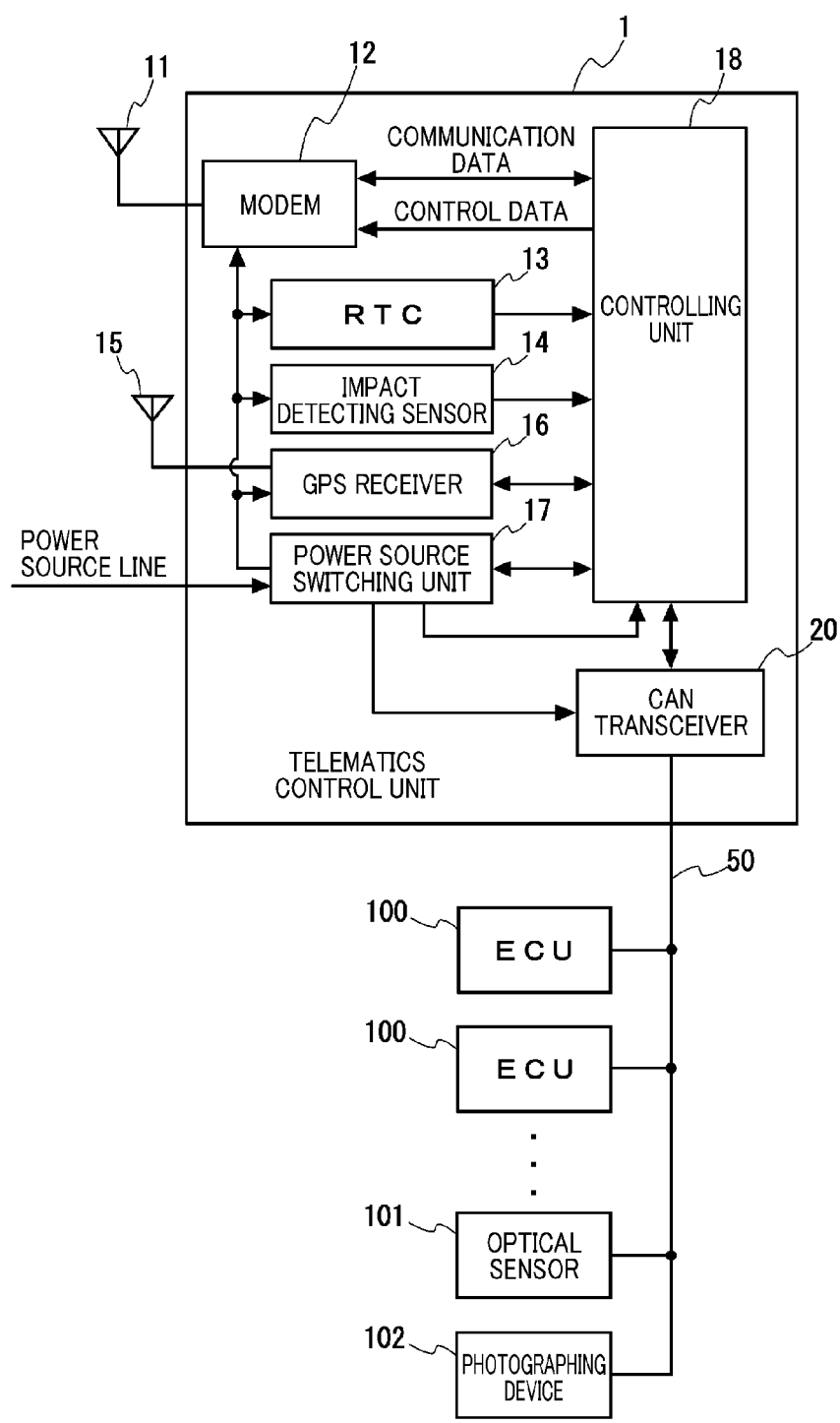
FIG. 1 is a view showing an example of a structure of a telematics control unit.

Hereinafter, an embodiment of a vehicle-mounted communication device will be described in detail with reference to FIGS. 1 to 9. FIG. 1 schematically shows a structure of a telematics control unit (hereinafter abbreviated as TCU) 1 that is used as a vehicle-mounted communication device.

The TCU 1 includes an antenna 11 and a modem 12. The antenna 11 receives a wireless signal, which is transmitted from a base station (not shown in the figures), and outputs the wireless signal to the modem 12. In addition, the antenna 11 outputs a wireless signal that is output from the modem 12. The modem 12 is connected to the antenna 11, a controlling unit 18, and a power source switching unit 17. The modem 12 receives control data from the controlling unit 18 and performs wireless communication in accordance with the control of the controlling unit 18. The modem 12 extracts analog communication data from the wireless signal, which is received via the antenna 11, and converts the extracted communication data into digital communication data by demodulating the data. The modem 12 outputs the converted digital communication data to the controlling unit 18. In addition, the modem 12 demodulates digital communication data, which is received from the controlling unit 18, into an analog signal and outputs the analog signal from the antenna 11. The modem 12 is operated by a power source that is supplied from the power source switching unit 17.

The ICU 1 includes a real time clock (hereinafter abbreviated as RTC) 13. The RTC 13 is connected to the controlling unit 18 and is also connected to the power source switching unit 17. The RTC 13 counts time based on the instruction from the controlling unit 18 and performs clocking processing such as interruption processing when a specified time has elapsed. The RTC 13 is operated by a power source that is supplied from the power source switching unit 17.

The TCU 1 includes an impact detecting sensor 14. The impact detecting sensor 14 is connected to the controlling unit 18 and is also connected to the power source switching unit 17. The impact detecting sensor 14 detects an impact, which occurs in a vehicle that is mounted with the TCU 1, and outputs a signal corresponding to the strength of the detected impact, to the controlling unit 18. As the impact detecting sensor 14, a device, which detects vibration, sound, or acceleration generated in a vehicle by an impact, such as a vibration sensor, a sound volume sensor, an acceleration sensor, or the like, may be used.

The TCU 1 includes a GPS antenna 15 and a GPS receiver 16. The GPS receiver 16 is connected to the GPS antenna 15, the controlling unit 18, and the power source switching unit 17. The GPS receiver 16 calculates a current location of a vehicle that is mounted with the TCU 1, based on a GPS signal received from the GPS antenna 15. The GPS receiver 16 supplies the calculated current location data to the controlling unit 18. In addition, the GPS receiver 16 periodically informs the controlling unit 18 of the number of GPS satellites, from which the GPS receiver 16 can receive the GPS signal.

The TCU 1 includes the power source switching unit 17. The power source switching unit 17 is connected to the modem 12, the RTC 13, the impact detecting sensor 14, the GPS receiver 16, the controlling unit 18, and a CAN (Controller Area Network) transceiver 20. The power source switching unit 17 is connected to a power source line so as to be supplied with electric power therefrom. The power source switching unit 17 supplies electric power, which is supplied from the power source line, to each of the units connected to the power source switching unit 17 in accordance with the control of the controlling unit 18.

The TCU 1 includes the controlling unit 18. The controlling unit 18 includes a CPU (Central Processing Unit (not shown in the figures)) and a memory 19 (refer to FIG. 5) as hardware. The memory 19 is a nonvolatile storage unit that is constructed of a magneto-optical storage medium or a semiconductor storage element. The memory 19 records a control program. Moreover, the memory 19 is used as a work memory of the CPU and stores data, which is used by the CPU for calculation, data, which is a result of the calculation performed by the CPU, etc. The hardware such as the CPU and the memory 19 works in conjunction with the control program, which is recorded in the memory 19, and thereby forms a functional block, which will be described with reference to FIG. 5.

The TCU 1 includes the CAN transceiver 20. The CAN transceiver 20 is connected to the controlling unit 18, a CAN bus 50, and the power source switching unit 17. The CAN bus 50 is connected to nodes of a plurality of ECUs (Electronic Control Units) 100, an optical sensor 101, a photographing device 102, and the like. Each of the nodes is mounted on a vehicle. The CAN transceiver 20 communicates with the nodes that are connected to the CAN bus 50, based on a CAN communication protocol in accordance with the control of the controlling unit 18.

Next, power modes of the ICU and electric power to be supplied to each of the units of the TCU 1 in each of the power modes will be described with reference to FIG. 2. The TCU 1 has an ordinary mode, a low power consumption mode, and a super low power consumption mode as the power modes.

The ordinary mode is a mode for supplying electric power to each of the units of the TCU 1 so as to operate each of the units. For example, when an ignition switch (hereinafter abbreviated as IG switch) of a vehicle is in the ON state, the TCU 1 is in the state of the ordinary mode.

The low power consumption mode is a mode for limiting the supply of the electric power to each of the units of the TCU 1, compared with the case of the ordinary mode. For example, when the IG switch of a vehicle is turned off, and the TCU 1 is located within a communicable area of a portable telephone network, the TCU 1 shifts to the low power consumption mode. In the low power consumption mode, the supply of the electric power to each of the units of the TCU 1 is limited in order to reduce a burden on a battery of the vehicle. In this case, each of the units of the TCU 1 operates in a power saving mode and shifts to a standby state in which the processing can be performed. For example, the modem 12 receives a signal that is transmitted from the base station (not shown in the figures) by an intermittent reception operation. When an air conditioner of a vehicle is controlled from the outside of the vehicle, a control signal that is transmitted from a portable device of the vehicle is received by the modem 12. After the modem 12 receives the control signal, the TCU 1 shifts to the ordinary mode, and the controlling unit 18 sends a control signal to the vehicle via the CAN transceiver 20.

The super low power consumption mode is a mode in which the supply of the electric power to the modem 12 is stopped. The supply of the electric power to each of the other units of the TCU 1 is performed in the power saving mode as in the case of the low power consumption mode. For example, when the IG switch of a vehicle is turned off, and the TCU 1 is located out of the communicable area of the portable telephone network, the TCU 1 shifts to the super low power consumption mode. Since the power source of the modem 12 is turned off, the vehicle cannot be controlled through wireless communication, but the super low power consumption mode is the most superior from the viewpoint of the reduction of the electric power consumption.

FIG. 3 shows an average value of electric current consumption in each of the operation modes. When the IG switch is in the ON state, and the TCU 1 operates in the ordinary operation mode, the average value of the electric current consumption of the TCU 1 is 1.0 A. When the IG switch is in the OFF state, and the TCU 1 operates in the low power consumption mode, the average value of the electric current consumption of the TCU 1 is 1.0 mA. Moreover, when the IG switch is in the OFF state, and the TCU 1 operates in the super low power consumption mode, the average value of the electric current consumption of the TCU 1 is 0.1 mA.

FIG. 4 shows an average value of electric current consumption in a case of shifting the mode of the TCU 1 to the low power consumption mode because the TCU 1 is located out of the communicable area of the portable telephone network when the IG switch is turned off. If the TCU 1 shifts to the low power consumption mode when the TCU 1 is located out of the communicable area of the portable telephone network, the average of the electric current consumption is such a large value as 5.0 mA because the modem 12 needs to search a communicable base station. Considering this fact, in this embodiment, when the IG switch is in the OFF state, and the TCU 1 is located out of the communicable area of the portable telephone network, the TCU 1 shifts to the super low power consumption mode. Then, the TCU 1 judges whether the TCU 1 reenters the communicable area of the portable telephone network at a predetermined time interval. The details of this processing will be described later.

Figure 5:
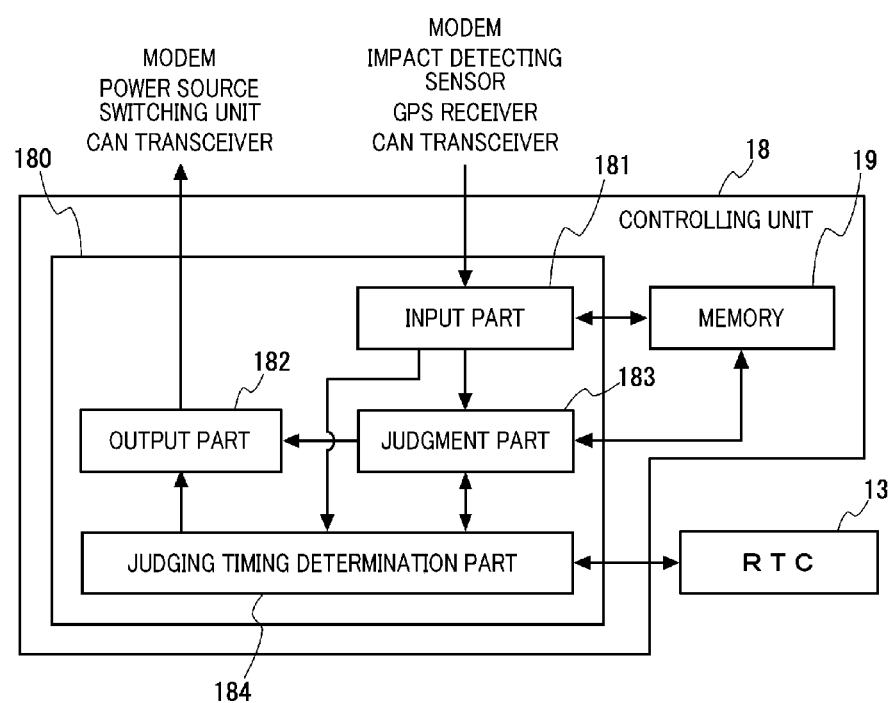
FIG. 5 is a view showing an example of a functional block diagram of a controlling unit.

Next, a functional block 180 of the controlling unit 18 is described with reference to FIG. 5. The functional block 180 is performed by executing the control program recorded in the memory 19 by the CPU. The controlling unit 18 includes an input part 181, an output part 182, a judgment part 183, and a judging timing determination part 184 as the functional block 180.

The input part 181 is connected to the modem 12, the impact detecting sensor 14, the GPS receiver 16, and the CAN transceiver 20, which are external units of the controlling unit 18, by signal wires such as of a bus. In addition, the input part 181 is connected to the memory 19 that is an internal part of the controlling unit 18. Moreover, the input part 181 is connected to the judgment part 183 and the judging timing determination part 184 inside the functional block 180.

The input part 181 receives data that are output from the modem 12, the impact detecting sensor 14, the GPS receiver 16, and the CAN transceiver 20, which are external units of the controlling unit 18. The input part 181 stores the received data in the memory 19. Moreover, the input part 181 outputs communication propriety information, which is output from the modem 12, to the judgment part 183. The communication propriety information is information showing whether the modem 12 is in the state of being communicable via the portable telephone network, that is, whether the modem 12 is in the state of being communicable with the base station in the portable telephone network. The input part 181 also outputs information of reception electric field intensity, which is output from the modem 12, to the judging timing determination part 184. The information of the reception electric field intensity is information showing the intensity of a radio wave, which is output from the base station in the portable telephone network and is received by the modem 12. The input part 181 also outputs information of the number of GPS satellites, which is output from the GPS receiver 16, to the judging timing determination part 184. The information of the number of the GPS satellites is information of the number of the GPS satellites, from which the GPS receiver 16 can receive a GPS signal. The input part 181 also outputs an input interruption input, which is received by the CAN transceiver 20 from the node, to the judging timing determination part 184. The interruption input is input when the intensity of light that is received by the vehicle is changed in the measurement performed by the optical sensor 101, when an image that is photographed by the photographing device 102 is changed, when a door or a window of the vehicle is opened or closed, and the like.

The output part 182 is connected to the judgment part 183 and the judging timing determination part 184, which are internal parts of the controlling unit 18. In addition, the output part 182 is connected to the modem 12, the power source switching unit 17, and the CAN transceiver 20, which are external units of the controlling unit 18, by signal lines such as of a bus. The output part 182 receives data from the judgment part 183 and the judging timing determination part 184 and outputs the received data to the signal lines.

The judgment part 183 controls the modem 12 and judges whether the modem 12 is in the state of being wirelessly communicable via the portable telephone network. That is, the judgment part 183 makes the modem 12 execute connection to the portable communication network. The modem 12 sends communication propriety information showing the communicable state to the judgment part 183 after the modem 12 is connected to the portable telephone network. On the other hand, the modem 12 sends communication propriety information showing an incommunicable state to the judgment part 183 if the modem 12 cannot be connected to the portable telephone network. The judgment part 183 sends the communication propriety information that is received from the modem 12, to the judging timing determination part 184.

The judging timing determination part 184 is connected to the input part 181, the judgment part 183, and the output part 182. In addition, the judging timing determination part 184 is connected to the RTC 13 that is an external unit of the controlling unit 18. The judging timing determination part 184 stops the judging operation of the judgment part 183 until a predetermined condition is satisfied, when the judgment part 183 judges the state as being not wireless communicable state via the portable telephone network while a driving source of the vehicle is stopped.

The judging timing determination part 184 determines the predetermined condition based on at least one of a change in the reception electric field intensity of the portable communication network before the driving source of the vehicle is stopped and a change in the number of the GPS satellites, from which a second communication part can receive a GPS signal, before the driving source of the vehicle is stopped. Here, although the driving source of the vehicle is an engine in this embodiment, the driving source may be a motor in a case of using an electric car as the vehicle. In addition, if the vehicle is a hybrid type car, the driving source is at least one of the engine and the motor. When the judging timing determination part 184 receives an interruption signal from the RT 13 in a condition in which the judging timing determination part 184 operates in the super low power consumption mode, the judging timing determination part 184 is started and shifts to the ordinary mode.

The processing of the judging timing determination part 184 is specifically described. The judging timing determination part 184 receives the information of the reception electric field intensity of the portable telephone network, which is transmitted from the modem 12 at a predetermined time interval, and sequentially stores the information in the memory 19, while the engine is driven. Moreover, while the engine is driven, the information of the number of the GPS satellites, from which the GPS signal can be received, is input from the GPS receiver 16 at a predetermined time interval, and the judging timing determination part 184 receives this information and sequentially stores this information in the memory 19. Furthermore, the judging timing determination part 184 receives speed information as vehicle information, which is transmitted from the CAN transceiver 20 at a predetermined time interval, and sequentially stores the information in the memory 19.

When the judging timing determination part 184 receives notification of turning off of an IG key as vehicle information via the CAN transceiver 20, the judging timing determination part 184 makes the modem 12 execute connection to the portable communication network and makes the judgment part 183 judge whether the modem 12 can connect to the portable communication network. The judging timing determination part 184 controls the power source switching unit 17 so that the TCU 1 is shifted to the low power consumption mode when the judging timing determination part 184 receives the communication propriety information showing the communicable state from the judgment part 183. On the other hand, the judging timing determination part 184 controls the power source switching unit 17 so that the TCU 1 is shifted to the super low power consumption mode when the judging timing determination part 184 receives the communication propriety information showing the incommunicable state from the judgment part 183.

The judging timing determination part 184 supplies electric power to the modem 12 and makes the judgment part 183 judge whether the modem 12 reenters the communicable area of the portable telephone network when a predetermined condition is satisfied in a condition in which the TCU 1 shifts in the super low power consumption mode. The predetermined condition is set based on at least one of the information of the reception electric field intensity of the portable telephone network and the information of the number of the GPS satellites, from which the GPS signal can be received, which are stored in the memory 19 before the engine is stopped. The judging timing determination part 184 judges whether the change in the reception electric field intensity before the engine of the vehicle is stopped is greater than a first threshold value (hereinafter called a first judgment). Alternatively, the judging timing determination part 184 judges whether the change in the number of the GPS satellites before the engine of the vehicle is stopped is greater than a second threshold value (hereinafter called a second judgment). Then, the judging timing determination part 184 stops the judgment part 183 from judging until the condition surrounding the vehicle is judged as being changed based on the information that is obtained from the vehicle, when an affirmative judgment is obtained in the first judgment or in the second judgment. The affirmative judgment is obtained when the change in the reception electric field intensity is judged as being greater than the first threshold value or when the change in the number of the GPS satellites is judged as being greater than the second threshold value.

On the other hand, the judging timing determination part 184 makes the judgment part 183 execute the judgment at a predetermined time interval when a negative judgment is obtained in the first judgment or in the second judgment. The negative judgment is obtained when the change in the reception electric field intensity is judged as being not greater than the first threshold value or when the change in the number of the GPS satellites is judged as being not greater than the second threshold value.

Figure 6:
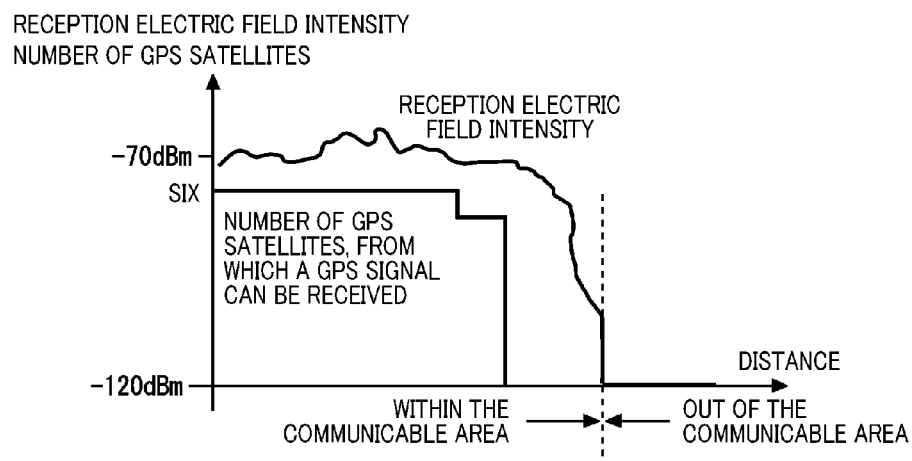
FIG. 6 is a view showing an example of the number of GPS satellites, from which a GPS signal can be received, and an example of reception electric field intensity.

FIG. 6 shows an example of a change in the number of the GPS satellites, from which the GPS signal can be received, and an example of a change in the reception electric field intensity. FIG. 6 shows the example of a case in which the reception electric field intensity is a middle electric field of approximately −70 dBm within a communicable area, but it is greatly deteriorated due to movement to the outside of the communicable area and is decreased to −120 dBm, for example. FIG. 6 also shows the example of a case in which the number of the GPS satellites, from which the GPS signal can be received, is approximately six within a communicable area, but suddenly becomes zero. It is expected that such great changes in the reception electric field intensity and in the number of the GPS satellites occur because the vehicle enters a condition, in which a radio wave from the outside is blocked off. For example, a case that a vehicle enters a garage is assumed as the condition, in which the radio wave is blocked off.

The judging timing determination part 184 performs the first judgment by using the information of the reception electric field intensity of the portable telephone network, which is stored in the memory 19 before the engine is stopped, when the engine is stopped and the operation mode is shifted to the super low power consumption mode. Alternatively, the judging timing determination part 184 performs the second judgment by using the information of the number of the GPS satellites, from which the GPS signal can be received, and which is stored in the memory 19 before the engine is stopped. When the affirmative judgment is obtained in the first judgment or in the second judgment, the judging timing determination part 184 stops the judgment part 183 from judging until the condition surrounding the vehicle is judged as being changed based on the information that is obtained from the vehicle. For example, in a case in which a blocking object is a garage, when open of a shutter of the garage is detected, the judgment part 183 is allowed to execute the judging processing. The open and close of the shutter may be detected by the optical sensor 101 or the photographing device 102, for example. For example, when the shutter is opened, and a change in the intensity of light that is received by the vehicle is detected by the optical sensor 101 or a change in the image that is photographed by the photographing device 102 is detected, the judging timing determination part 184 judges the circumstance surrounding the vehicle as being changed. The judging timing determination part 184 may make the judgment part 183 execute the judging processing when the impact detecting sensor 14 detects application of an impact to the vehicle. The judging timing determination part 184 may also make the judgment part 183 execute the judging processing when the current location of the vehicle, which is calculated by the GPS receiver 16, is changed. Moreover, the judging timing determination part 184 may make the judgment part 183 execute the judging processing when information of open or close of a door or a window of the vehicle is input as the information that is obtained from the vehicle.

Figure 7:
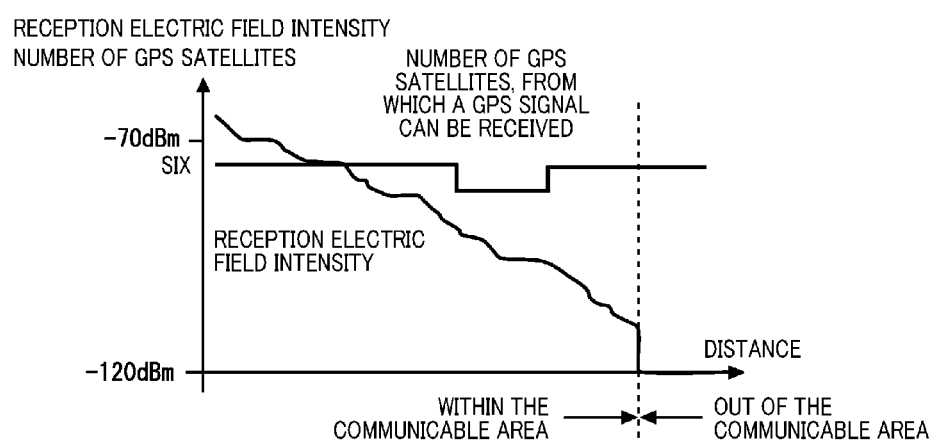
FIG. 7 is a view showing another example of the number of the GPS satellites, from which the GPS signal can be received, and another example of the reception electric field intensity.

FIG. 7 shows another example of a change in the number of the GPS satellites, from which the GPS signal can be received, and another example of a change in the reception electric field intensity. In the example shown in FIG. 7, both the reception electric field intensity of the portable telephone network and the number of the GPS satellites, from which the GPS signal can be received, are gradually degraded (decreased). Such a case may occur when a vehicle that is mounted with the TCU 1 travels from a city, which is equipped with a sufficient number of base stations of the portable telephone network, to a suburb, which is equipped with a small number of the base stations. That is, it can be considered that a radio wave that is sent from a base station does not reach the TCU 1 due to distance attenuation, whereby the vehicle is located outside of the communicable area. In such a case, it is not preferable to make the judgment part 183 execute the judging processing frequently.

The judging timing determination part 184 performs the first judgment or the second judgment by using the information stored in the memory 19 before the engine is stopped. When a negative judgment is obtained in the first judgment or in the second judgment, the judging timing determination part 184 judges whether the modem 12 can connect to the portable telephone network at a predetermined period.

Here, the difference between the case, in which the communication part for performing wireless communication is the modem 12 of the TCU 1 mounted on the vehicle, and a case, in which the communication part is a portable telephone, is described. When the IG switch of the vehicle is in the OFF state, there is a low probability that the TCU 1 is moved and immediately reenters the communicable area of the portable telephone network. Therefore, the time interval for making the judgment part 183 judge whether the modem 12 reenters the communicable area of the portable telephone network can be set to be sufficiently long. In contrast, normally, the portable telephone is carried by a user. If the time interval for judging whether the portable telephone reenters the communicable area is set long, there may be cases in which communication cannot be performed although the portable telephone reenters the communicable area. Therefore, in the case of using the portable telephone, the time interval for judging whether the portable telephone reenters the communicable area should not be set long.

Next, a processing flow of the controlling unit 18 is described with reference to flow charts shown in FIGS. 8 and 9. First, the controlling unit 18 judges whether the information of the reception electric field intensity is input from the modem 12 (step S1). The modem 12 sends the information of the reception electric field intensity of the portable telephone network to the controlling unit 18 at a predetermined time interval. After the information of the reception electric field intensity is input from the modem 12 (step S1/YES), the controlling unit 18 stores the input information of the reception electric field intensity in the memory 19 (step S2) and shifts the processing to step S3. The information of the reception electric field intensity is stored in the memory 19 in the order of elapsed time. Alternatively, the controlling unit 18 shifts the processing to the judgment in step S3 when a negative judgment is obtained in the judgment in step S1. In step S3, the controlling unit 18 judges whether the information of the number of the GPS satellites, from which the GPS signal can be received, is input from the GPS receiver 16 (step S3). The GPS receiver 16 sends the information of the number of the GPS satellites, from which the GPS signal can be received, to the controlling unit 18 at a predetermined time interval. After the information of the number of the GPS satellites is input from the GPS receiver 16 (step S3/YES), the controlling unit 18 stores the input information of the number of the GPS satellites in the memory 19 (step S4) and shifts the processing to step S5. The information of the number of the GPS satellites is stored in the memory 19 in the order of elapsed time. Alternatively, the controlling unit 18 shifts the processing to the judgment in step S5 when a negative judgment is obtained in the judgment in step S3.

In step S5, the controlling unit 18 judges whether data showing the vehicle information is received from the CAN transceiver 20 (step S5). The vehicle information includes the vehicle speed, operation information of the IG switch and the like, the information of the intensity of light measured by the optical sensor 101, the information of the image that is photographed by the photographing device 102, etc. When the CAN transceiver 20 receives the data showing the vehicle information via the CAN bus 50, the CAN transceiver 20 sends the received data to the controlling unit 18. After the data showing the vehicle information is input from the CAN transceiver 20, the controlling unit 18 stores the input data in the memory 19 (step S6) and shifts the processing to step S7. Alternatively, the controlling unit 18 shifts the processing to the judgment in step S7 when a negative judgment is obtained in the judgment in step S5.

In step S7, the controlling unit 18 judges whether the IG switch is turned off (step S7). After the controlling unit 18 receives notification of turning off of the IG switch via the CAN transceiver 20 (step S7/YES), the controlling unit 18 shifts the processing to step S8. Alternatively, if the notification of turning off of the IG switch is not received (step S7/NO), the controlling unit 18 shifts the processing to step S1 and repeats the processing from step S1 to step S7.

Next, the processing subsequent to the processing in step S7 is also described with reference to the flowchart shown in FIG. 9. In step S8, the controlling unit 18 inquires of the modem 12 whether the modem 12 is in the state of being connectable to the portable telephone network (step S8). The modem 12 sends the communication propriety information showing the communicable state to the controlling unit 18 while the modem 12 is trying to connect to the portable telephone network. If the modem 12 is not connected to the portable telephone network, the modem 12 tries to connect to the portable telephone network. Then, after the modem 12 is connected to the portable telephone network, the modem 12 sends the communication propriety information showing the communicable state to the controlling unit 18. On the other hand, if the modem 12 cannot be connected to the portable telephone network, the modem 12 sends the communication propriety information showing the incommunicable state to the controlling unit 18.

When the controlling unit 18 judges the state as being connectable to the portable telephone network (that is, judges the modem 12 as being located within the communicable area), based on the communication propriety information from the modem 12 (step S8/YES), the controlling unit 18 shifts to the low power consumption mode (step S9). In the low power consumption mode, since the modem 12 and the GPS receiver 16 operate in the power saving mode, the TCU 1 is started at a predetermined time interval so as to receive the communication data, which is transmitted from the base station, and the GPS signal, which is transmitted from the GPS satellite. Then, the controlling unit 18 judges whether notification of turning on of the IG switch is input from the CAN transceiver 20 (step S10). When the notification of turning on of the IG switch is input (step S10/YES), the controlling unit 18 shifts to the ordinary mode and performs the processing from step S1. Alternatively, if the notification of turning on of the IG switch is not input (step S10/NO), the controlling unit 18 stands by until the notification of turning on of the IG switch is input from the CAN transceiver 20 (step S10).

Next, a case, in which connection to the portable telephone network cannot be performed (negative judgment) in the judgment in step S8, is described. When the communication propriety information showing the incommunicable state is input from the modem 12 (step S8/NO), the controlling unit 18 judges whether the change in the reception electric field intensity is not greater than the first threshold value, based on the information of the reception electric field intensity stored in the memory 19 (step S11). The memory 19 stores the information of the reception electric field intensity during driving of the engine, in the order of elapsed time. In this case, the controlling unit 18 judges whether the change in the reception electric field intensity immediately before the engine is stopped is not greater than the first threshold value, based on the information of the reception electric field intensity immediately before the engine is stopped (step S11). If the change in the reception electric field intensity immediately before the engine is stopped is not greater than the first threshold value (step S11/YES), the controlling unit 18 judges the vehicle as being traveled to a suburb that is equipped with a small number of the base stations and shifts to the super low power consumption mode (step S12). Then, the controlling unit 18 turns on the power source of the modem 12 (step S15) at a predetermined time interval (step S13/YES) so as to inquire whether the modem 12 is in the state of being connectable to the portable telephone network (step S8). If the IG switch is turned on before the predetermined time passes (step S14/YES), the controlling unit 18 shifts the operation mode to the ordinary mode and executes the processing from step S1.

On the other hand, if the change in the reception electric field intensity immediately before the engine is stopped, is judged as being greater than the first threshold value (step S11/NO), the controlling unit 18 judges the radio wave as being blocked off by a blocking object around the vehicle and shifts to the super low power consumption mode (step S16). Then, the controlling unit 18 stands by until an interruption input is input (step S17). For example, when a change in the intensity of light that is received by the vehicle and is detected by the optical sensor 101 or a change in the image that is photographed by the photographing device 102 is detected, the controlling unit 18 receives the interruption input from the optical sensor 101 or the photographing device 102. In addition, when application of an impact to the vehicle is detected by the impact detecting sensor 14, the controlling unit 18 receives the interruption input from the impact detecting sensor 14. After the interruption single is detected (step S17/YES), the controlling unit 18 turns on the power source of the modem 12 (step S15) so as to inquire whether the modem 12 is in the state of being connectable to the portable telephone network (step S8). If the IG switch is turned on before the interruption input is detected (step S18/YES), the controlling unit 18 shifts the operation mode to the ordinary mode and executes the processing from step S1.

In this processing flow, in the judgment in step S11, whether the change in the reception electric field intensity is not greater than the first threshold value is judged. Alternatively, the judgment in step S11 may be performed based on the change in the number of the GPS satellites, from which the GPS signal can be received, or based on both the change in the reception electric field intensity and the change in the number of the GPS satellites.

As described above, in this embodiment, when the judgment part 183 judges the state as being not wireless communicable state via the portable telephone network while the engine of the vehicle is stopped, the judgment part 183 is stopped from operating of judging whether the modem 12 is in the wireless communicable state by operating the modem 12, until a predetermined condition is satisfied. Therefore, when the modem 12 is not in the wireless communicable state via the portable telephone network while the engine of the vehicle is stopped, the electric power consumption can be reduced.

In this embodiment, the condition for allowing the modem 12 to execute connection to the portable telephone network is determined based on the change in the communication state of at least one of the modem 12 and the GPS receiver 16 before the engine is stopped. For example, if the change in the reception electric field intensity of the portable telephone network before the engine is stopped is greater than the first threshold value, or the number of the GPS satellites before the engine is stopped is greater than the second threshold value, it is assumed that the vehicle is located within the communicable area of the portable telephone network, but the radio wave is blocked off by a building such as a garage. On the other hand, if the change in the reception electric field intensity of the portable telephone network before the engine is stopped is not greater than the first threshold value, or the number of the GPS satellites before the engine is stopped is not greater than the second threshold value, it is assumed that the vehicle traveled from a city, which is equipped with a sufficient number of the base stations, to a suburb, which is equipped with a small number of the base stations. In view of these cases, the communication state at the location, at which the vehicle stops, is appropriately evaluated, and the timing for allowing the modem 12 to execute connection to the portable telephone network is changed, whereby unnecessary communication of the modem 12 is reduced, and the electric power consumption can be reduced while the engine is stopped.

If the change in the reception electric field intensity of the portable telephone network is greater than the first threshold value, or the number of the GPS satellites is greater than the second threshold value, the vehicle is judged as being in a condition that the radio wave is blocked off. In this case, the modem 12 is stopped from executing connection to the portable telephone network until the condition surrounding the vehicle is judged as being changed, based on the information obtained from the vehicle. Accordingly, since the processing for executing connection to the portable telephone network is stopped until the condition surrounding the vehicle is judged as being changed, unnecessary electric power consumption for executing connection operation to the portable telephone network can be reduced.

On the other hand, if the change in the reception electric field intensity of the portable telephone network is not greater than the first threshold value, or the number of the GPS satellites is not greater than the second threshold value, the vehicle is judged as being in a condition in which the radio wave is not blocked off. In this case, the modem 12 is made to execute connection to the portable telephone network at a predetermined time interval. There may be cases in which the distance attenuation characteristic of the radio wave fluctuates due to changes in the temperature, the weather, and the like, and thereby the connection to the portable telephone network becomes possible. Therefore, by executing connection to the portable telephone network at a predetermined time interval, the connection is achieved when the modem 12 can connect to the portable telephone network, and information can be obtained via the portable telephone network.

Moreover, when the modem 12 is judged as being not in the communicable state via the portable telephone network while the engine is stopped, the supply of the power source to the modem 12 is stopped. Accordingly, while the engine is stopped, the electric power consumption of the battery of the vehicle can be reduced.

The above embodiment is merely an embodiment of the present invention. The present invention is not limited to the above embodiment and can be modified or applied as desired within the concept of the present invention. For example, in the above embodiment, the operation mode of the TCU 1 is changed when the IG switch is turned off. In another example, in an electric car, if a switch for accessories can be turned on or off independently of the travelable state of the vehicle, the operation mode of the TCU 1 may be shifted from the ordinary mode to the super low power consumption mode by turning on this switch.

REFERENCE SIGNS LIST 1 telematics control unit
11 antenna
12 modem (communication part, first communication part)
16 GPS receiver (communication part, second communication part)
17 power source switching unit
18 controlling unit
19 memory
20 CAN transceiver
100 ECU
101 optical sensor
102 photographing device
181 input part
182 output part
183 judgment part
184 judging timing determination part

The invention claimed is:
1. A vehicle-mounted communication device comprising:
a controlling unit;
a modem connected to the controlling unit to receive control data and performing wireless communication; and
a power source switching unit connected to the modem and the controlling unit, and performing a supply of electric power,
wherein the controlling unit includes a communication part, a judgment part, and a judging timing determination part,
the communication part performs wireless communication through the modem,
the judgment part controls the modem and judges whether the communication part is in a wireless communicable state in accordance with communication propriety information transmitted from the modem,
the judging timing determination part controls the power source switching unit to shift to a first low power consumption mode for limiting the supply of the electric power when the judging timing determination part receives the communication propriety information showing a communicable state in the wireless communication from the judgment part while a driving source of a vehicle is stopped, and
the judging timing determination part controls the power source switching unit to shift to a second low power consumption mode when the judging timing determination part receives the communication propriety information showing an incommunicable state in the wireless communication from the judgment part while the driving source of the vehicle is stopped, and stops the judgment part from operating of judging whether the communication part is in the wireless communicable state by operating the communication part, until a condition predetermined based on a change in a reception electric field intensity of a portable communication network before the driving source of the vehicle is stopped is satisfied.

2. The vehicle-mounted communication device according to claim 1,
wherein the communication part includes a first communication part, which is configured to perform communication via the portable communication network, and a second communication part, which is configured to receive a GPS signal that is transmitted from a GPS satellite, and
wherein the judging timing determination part determines the condition predetermined based on at least one of the change in the reception electric field intensity of the portable communication network before the driving source of the vehicle is stopped and a change in the number of the GPS satellites, from which the second communication part receives the GPS signal, before the driving source of the vehicle is stopped.

3. The vehicle-mounted communication device according to claim 2,
wherein the judging timing determination part stops the judgment operation of the judgment part until a condition surrounding the vehicle is judged as being changed, based on information that is obtained from the vehicle, when the change in the reception electric field intensity of the portable communication network before the driving source of the vehicle is stopped, is judged as being greater than a first threshold value.

4. The vehicle-mounted communication device according to claim 3,
wherein the judging timing determination part receives at least one of information of the intensity of light that is received by the vehicle, which is detected by an optical sensor, and a surrounding image of the vehicle as the information obtained from the vehicle, and
wherein the judging timing determination part makes the judgment part judge whether the wireless communication is in an enabled state, when at least one of a change in the intensity of the light and a change in the surrounding image of the vehicle is detected.

5. The vehicle-mounted communication device according to claim 2,
wherein the judging timing determination part makes the judgment part execute the judgment operation at a predetermined time interval when the change in the reception electric field intensity of the portable communication network before the driving source of the vehicle is stopped, is judged as being not greater than the first threshold value.

6. The vehicle-mounted communication device according to claim 2,
wherein the judging timing determination part stops the judgment operation of the judgment part until a condition surrounding the vehicle is judged as being changed, based on information that is obtained from the vehicle, when the change in the number of the GPS satellites, from which the GPS signal is received, before the driving source of the vehicle is stopped, is judged as being greater than a second threshold value.

7. The vehicle-mounted communication device according to claim 2,
wherein the judging timing determination part makes the judgment part execute the judgment operation at a predetermined time interval when the change in the number of the GPS satellites, from which the GPS signal is received, before the driving source of the vehicle is stopped, is judged as being not greater than the second threshold value.

8. The vehicle-mounted communication device according to claim 1,
wherein the judging timing determination part stops the supply of the power source to the communication part when the judging timing determination part receives the communication propriety information showing an incommunicable state in the wireless communication from the judgment part while the driving source of the vehicle is stopped.

9. A method for controlling a vehicle-mounted communication device which includes a controlling unit connected to a modem and a power source switching unit which performs a supply of electric power, the method comprising the steps of:
performing wireless communication by a communication part of the controlling unit through the modem;
judging by a judgement part of the controlling unit whether the communication part is in a wireless communicable state in accordance with communication propriety information transmitted from the modem;
controlling the power source switching unit by a judging timing determination part of the controlling unit and shifting to a first low power consumption mode for limiting the supply of the electric power when the judging timing determination part receives the communication propriety information showing a communicable state in the wireless communication from the judgment part while a driving source of a vehicle is stopped; and controlling the power source switching unit by the judging timing determination part of the controlling unit and shifting to a second low power consumption mode when the judging timing determination part receives the communication propriety information showing an incommunicable state in the wireless communication from the judgment part while the driving source of the vehicle is stopped, and stopping the judging processing in the step of judging whether the communication part is in the wireless communicable state by operating the communication part, until a condition predetermined based on a change in a reception electric field intensity of a portable communication network before the driving source of the vehicle is stopped is satisfied.

10. The method for controlling the vehicle-mounted communication device according to claim 9,
wherein the step of performing wireless communication by the communication part includes performing communication via the portable communication network in a first communication part, and receiving a GPS signal that is transmitted from a GPS satellite in a second communication part, and
wherein the condition is determined in the step of controlling the power source switching unit by the judging timing determination part and shifting to the second low power consumption mode based on at least one of a change in a reception electric field intensity of the portable communication network before the driving source of the vehicle is stopped and a change in the number of the GPS satellites, from which the second communication part receives the GPS signal, before the driving source of the vehicle is stopped.

11. The method for controlling the vehicle-mounted communication device according to claim 10,
wherein the judging processing in the step of judging is stopped until a condition surrounding the vehicle is judged as being changed, based on information that is obtained from the vehicle, when the change in the reception electric field intensity of the portable communication network before the driving source of the vehicle is stopped, is judged as being greater than a first threshold value in the step of controlling the power source switching unit by the judging timing determination part and shifting to the second low power consumption mode.

12. The method for controlling the vehicle-mounted communication device according to claim 11,
wherein at least one of information of the intensity of light that is received by the vehicle, which is detected by an optical sensor, and a surrounding image of the vehicle is input as the information obtained from the vehicle in the step of controlling the power source switching unit by the judging timing determination part and shifting to the second low power consumption mode, and
wherein judging in the step of judging is executed when at least one of a change in the intensity of the light and a change in the surrounding image of the vehicle is detected.

13. The method for controlling the vehicle-mounted communication device according to claim 10,
wherein the judging processing in the step of judging is executed at a predetermined time interval when the change in the reception electric field intensity of the portable communication network before the driving source of the vehicle is stopped, is judged as being not greater than the first threshold value in the step of controlling the power source switching unit by the judging timing determination part and shifting to the second low power consumption mode.

14. The method for controlling the vehicle-mounted communication device according to claim 10,
wherein the judging processing in the step of judging is stopped until a condition surrounding the vehicle is judged as being changed, based on information that is obtained from the vehicle, when the change in the number of the GPS satellites, from which the GPS signal is received, before the driving source of the vehicle is stopped, is judged as being greater than a second threshold value in the step of controlling the power source switching unit by the judging timing determination part and shifting to the second low power consumption mode.

15. The method for controlling the vehicle-mounted communication device according to claim 10,
wherein the judging processing in the step of judging is executed at a predetermined time interval when the change in the number of the GPS satellites, from which the GPS signal is received, before the driving source of the vehicle is stopped, is judged as being not greater than the second threshold value in the step of controlling the power source switching unit by the judging timing determination part and shifting to the second low power consumption mode.

* * * * *